United States Patent Office 3,642,776
Patented Feb. 15, 1972

3,642,776
1-FORMYL-2-HALOGENO-AZACYCLOALKENES AND PROCESS FOR THEIR PRODUCTION
Verena R. Foitl, Dobbs Ferry, N.Y., and Walter Traber, Riehen, Switzerland, assignors to Geigy Chemical Corporation, Ardsley, N.Y.
No Drawing. Filed Jan. 22, 1969, Ser. No. 793,165
Claims priority, application Switzerland, Jan. 22, 1968, 939/68
Int. Cl. C07d 27/16, 29/38, 41/08
U.S. Cl. 260—239 BE          13 Claims

ABSTRACT OF THE DISCLOSURE 1-formyl-2-halogeno-azacycloalkenes of the formula

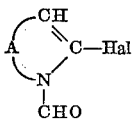

wherein A represents a straight-chained or branched alkylene radical of from 4 to 10 carbon atoms and Hal represents halogen, are disclosed as important intermediates for the production of amino acids such as lysine and agricultural chemicals, e.g. certain fungicides; a process for producing these intermediates in good yields from corresponding azacycloalkanones is also described.

DESCRIPTION OF THE INVENTION

The present invention concerns new 1-formyl-2-halogenoazacycloalkenes and a process for their production.

From the literature the reaction of activated aromatic compounds with formylating reactants to form aldehydes is known, said formylating reactants being the adducts of an N,N-disubstituted formamide and an acid halogenating agent (Vilsmeier-Haak-Reaction). In British patent specifications Nos. 901,169 and 901,170 the preparation of 2-chloro - azacyclo - 2,3 - alkene-N-carbochlorides from ε-caprolactams and ω-caprolactam, respectively, by reaction with phosgene, is described.

It has now been found that new 1-formyl-2-halogenoazacycloalkenes of the Formula I

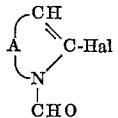
(I)

wherein: A represents a straight chained or branched alkylene radical of from 4 to 10 carbon atoms, and Hal represents halogen, preferably middle halogen, are obtained as the sole reaction product, in a surprisingly simple manner and with good yields, by reacting azacycloalkanones of the Formula II

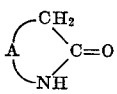
(II)

wherein A has the meanings given under Formula I, with a formylating reactant which is the adduct of an N,N-disubstituted formamide and an acid halogenating agent, and hydrolysing the obtained reaction product. The presence of an organic aprotic solvent and/or diluent is necessary for this reaction.

Suitable azacycloalkanones of the Formula II for the process according to the invention are e.g., azacycloheptanone-(2), azacyclooctanone-(2), azacyclononanone-(2)-, azacyclodecanone - (2), azacycloundecanone - (2), azacyclododecanone-(2) and azacyclotridecanone-(2).

As alkylene radical A may be mentioned, for instance, the tetramethylene, pentamethylene, hexamethylene, heptamethylene, octamethylene, nonamethylene, decamethylene, which may be substituted by lower alkyl radicals having 1 to 6 carbon atoms, e.g., the methyl, ethyl, n-propyl, isopropyl, n-butyl, sec-butyl, tert-butyl radical as well as the pentyl and hexyl radicals.

Suitable for producing the formylating reactant are N,N-disubstituted formamides of the Formula III

(III)

wherein:

$R_1$ represents an alkyl radical having 1 to 5 carbon atoms,
$R_2$ represents an alkyl radical having 1 to 5 carbon atoms, the phenyl radical, the benzyl radical or the cyclohexyl radical or
$R_1$ and $R_2$ together with the adjacent nitrogen atom represent a mononuclear heterocycle which may have other hetero atoms as ring members.

As formamides of Formula III there are preferably used N,N-dimethyl formamide, N,N-diethyl formamide, N-methyl-N-phenyl formamide, N-formyl-morpholine and N-formyl-piperidine, in particular N,N - dimethylformamide.

As halogenating agents there can be employed, for example, phosphorus halides, phosphorus oxyhalides, thionyl chloride, phosgene, and also oxalylchloride, benzoylbromide and sulfurylchloride. For the process according to the invention, halides of inorganic oxyacids have proved to be the most suitable. Particularly good yields of azacycloalkenes of the Formula I are obtained when using phosphorus oxychloride, phosphorus oxybromide, phosgene, phosphorus pentachloride, phosphorus trichloride, thionyl chloride, or mixtures thereof.

In the process according to the invention, the starting materials, azacycloalkanone, N,N-disubstituted formamide and the halogenating agent, are preferably used in a molar ratio of 1:1:2.

Especially suitable as aprotic organic solvents and/or diluents are aliphatic halogeno-hydrocarbons, such as trichloroethylene, 1,2-dichloroethylene, chloroform, as well as aromatic hydrocarbons, such as benzene, toluene, and aromatic halogeno hydrocarbons. If, in the reaction of N,N-disubstituted formamide with one of the mentioned halogenating agents, a considerable excess of formamide is used, i.e. more than twice the molar amount, then this excess acts as a solvent or diluent.

In carrying out the process according to the invention, it has been proved to be advantageous to apply the corresponding formamide and then to add the halogenating agent (e.g. acid chloride), at temperatures between 0 and 40° C., preferably between 0 and 10° C. and with very thorough mixing. If the formamide is brought into the reaction in molar amounts, then the presence of one of the aforementioned organic, aprotic solvents is necessary, such as e.g., benzene and chloroform. The halogenating agent can likewise be used as a solution in such solvent. The azacycloalkanone, optionally diluted with further amounts of solvent, is added to the formylating reactant solution. In order to further accelerate the reaction which takes place without difficulty at temperatures between 0 and 40° C., the reaction mixture may be heated to temperatures of at most 120° C. preferably to temperatures between 60 and 85° C. After cooling, the reaction product is carefully hydrolysed, at temperatures below +10° C., with a base or a buffer reagent. It is advantageous to use a base, sodium hydroxide for example, and to carry out the hydrolysis with a pH-value of above 8. The reaction product can then be extracted in a manner known per se with a suitable organic aprotic solvent. The extraction solution is then dried and the solvent distilled off. By fractionating the distillation residue, the 1-formyl-2-halogeno-azacycloalkenes according to the invention are obtained in good yield rates and are of high purity; they are practically free of undesirable impurities.

The new 1 - formyl - 2 - halogeno-azacycloalkenes of Formula I are important intermediate products for the production of amino acids (e.g. lysine) which are important as nutritive factors, and of agricultural chemicals, e.g. the fungicides described in the British Pat. No. 1,058,521.

The following non-limitative examples serve to illustrate the process according to the invention. The temperatures are given in degrees centigrade; boiling points are not corrected. Percentages are given by weight.

EXAMPLE 1

338 g. of phosphorus oxychloride, dissolved in 200 ml. of benzene, are added dropwise, while stirring to 145 g. of dimethyl formamide in 200 ml. of benzene within 90 minutes, and the mixture is cooled to 30°. 113 g. of azacycloheptan-2-one, dissolved in 500 ml. of benzene, are added within 3 hours, whereby the temperature increases to 45°. The mixture is refluxed during 6 hours. After cooling, the acid phase is separated, made alkaline with 5 N aqueous sodium hydroxide solution and extracted with chloroform. The combined extracts are dried over sodium sulphate. The chloroform is distilled off. The residue, 1-formyl-2-chloro-azacycloheptene-(2), has after distillation a boiling point of 65–68°/0.8 torr. The yield rate is 91% of the theoretical value.

EXAMPLE 2

210 g. of phosphorus pentachloride are introduced in portions and while stirring into the mixture of 38 g. of dimethyl formamide and 150 ml. of benzene. The temperature rises to ca. 25°. The mixture is allowed to cool slightly and is then stirred for 1 hour at room temperature. 56.5 g. of azacycloheptan-2-one, dissolved in 200 ml. of benzene, are then added dropwise to the mixture (temperature rise to 35°). The mixture is then stirred at room temperature during ca. 60 hours. 2 layers are formed and the lower oily layer is decomposed with ice, then made alkaline with concentrated sodium hydroxide solution (pH 10–11) and repeatedly extracted with chloroform. The residue of the chloroform extracts, 1-formyl-2-chloro-azacycloheptene-(2) has, after distillation under high vacuum, a boiling point of 100–105°/1.5 torr. The yield rate is 91% of the theoretical value.

EXAMPLE 3

27.4 g. of dimethyl formamide are dissolved in 50 ml. of benzene and within 1 hour they are mixed dropwise, at a temperature of 15–20°, with a solution of 24 g. of thionyl chloride in 100 ml. of benzene. This solution is stirred for 1 hour at room temperature and to it is then slowly added dropwise a solution of 11.31 g. of azacycloheptan-2-one in 100 ml. of benzene. The mixture is stirred over-night at room temperature. The benzene phase is separated. The aqueous phase is made alkaline while cooling with ice, extracted with chloroform, dried and the solvent distilled off, whereby 16 g. of oily residue remain. The crude product is separated over silica gel with ethyl acetate. The yield rate of 1-formyl-2-chloro-azacycloheptene-(2) is 42.8% of the theoretical value.

EXAMPLE 4

30 g. of phosgene are introduced, while stirring and at 0 to 5°, into a solution of 29 g. of dimethyl formamide in 300 ml. of benzene. The adduct crystallises out in the form of colourless crystals, and without being isolated it is mixed dropwise with a solution of 11.3 g. of azacycloheptan-2-one in 50 ml. of benzene. The reaction mixture is then stirred for 12 hours at room temperature. It is then heated for 2 hours at 55–60° and, after cooling, it is made alkaline, while cooling with ice, using 2 N aqueous NaOH-solution. The aqueous phase is repeatedly extracted with benzene and the benzene extracts are combined and dried. After the benzene has been distilled off, the oily residue is fractionated. There is obtained 1-formyl-2-chloro-azacycloheptene-(2) having a boiling point of 65–68°/0.5 torr. The yield rate is 81.5% of the theoretical value.

EXAMPLE 5

181 g. of phosgene are introduced within 3.5 hours at temperatures between 10 and 20°, into a solution of 175 g. of dimethyl formamide in 1800 ml. of chloroform. To this solution are then added dropwise, 101.7 g. of 5-tert-butyl-azacycloheptan-2-one, dissolved in 300 ml. of chloroform. The clear reaction mixture is stirred for 12 hours at room temperature and subsequently heated for 2 hours at 50 to 55°. When cold and after cooling in an ice bath, the chloroform solution is poured into 2 litres of ice water and, while cooling well, it is made alkaline with concentrated sodium hydroxide solution. The aqueous phase is then separated and repeatedly extracted with chloroform. The chloroform extracts are combined, washed with water and dried. The chloroform is distilled off in vacuo. The residue, which is 5-tert-butyl-2-chloro-1-formyl-azacycloheptene-(2), has a boiling point of 111–112°/0.02 torr and the refractive index $n_{20}{}^D$ 1.5074. The yield rate is 67% of the theoretical value.

The following 1-formyl-2-halogeno-azacycloalkenes are obtained in the manner described in the preceding examples, using equimolar amounts of the corresponding azacycloalkanone and of the adduct from dimethyl formamide, and of the condensation agent given in column 1:

| Condensation agent | 1-formyl-2-halogen-azacycloalkene | Boiling point/melting point |
|---|---|---|
| Phosphorus oxychloride | 1-formyl-2-chloro-azacyclooctene-(2). | 64–66°/0.02 torr |
| Phosphorus pentachloride | | |
| Phosphorus oxychloride | 1-formyl-2-chloro-azacyclotridecene-(2). | 158–161° |

EXAMPLE 6

54 g. of phosphorus tribromide are added dropwise at 0 to 5° to a solution of 34 g. of dimethyl formamide in 200 ml. of anhydrous chloroform. The reaction mixture is then stirred for 1 hour at the same temperature. After having added dropwise at 5 to 10° 6 g. of azacycloheptan-2-one dissolved in 120 ml. of chloroform, the reaction mixture is stirred at room temperature for 20 hours. The obtained yellow, slightly turbid solution is poured into 500 ml. of ice water and made alkaline by adding 30% aqueous sodium hydroxide. The chloroform solution is separated, and the aqueous phase is extracted three times with 100 ml. of chloroform. The chloroform extracts are washed twice with each time 100 ml. of water, dried over sodium sulfate, filtered and the chloroform distilled off at water jet vacuum. The oily 1-formyl-2-bromo-azacycloheptene-(2) thus obtained has a boiling point of 61–62°/0.05 torr. The yield rate is 45% of the theoretical value.

The preparation of e.g. the fungicides known from the British Pat. No. 1,058,521 is described in the following non-limitative example:

EXAMPLE 7

(a) 1-formyl-3-nitro-azacycloheptan-2-one 31.4 g. of 1-formyl-2-chloro-azacycloheptene-(2) are poured dropwise, while well strring, at 5–10° into a nitrating acid consisting of 25.5 g. of concentrated nitric acid (about 68%) and of 61.0 g. of concentrated sulphuric acid (spec. weight 1.84). The mixture is stirred at this temperature for 30 minutes and then poured into 1000 ml. of ice water. The white, crystalline precipitate formed is filtered off, washed with water and dried. The 1-formyl-3-nitro-azacycloheptan-2-one obtained melts after crystallization from anhydrous ethanol at 120–122°.

(b) 3-nitro-azacycloheptan-2-one 5 g. of 1-formyl-3-nitro-azacycloheptan-2-one dissolved in 10 ml. of water are refluxed for 45 minutes. The mixture is then cooled at room temperature and the 3-nitro-azacycloheptan-2-one formed is filtered off and dried. It melts at 165–168° (uncorrected).

(c) 3-amino-azacycloheptan-2-one 5 g. of a mixture of palladium and carbon are added to a solution of 81.4 g. of 3-nitro-azacycloheptan-2-one in 800 ml. of anhydrous ethanol and the reaction mixture is shaken at normal pressure and at room temperature in a hydrogen atmosphere until the theoretical quantity of hydrogen (34.6 liters) is absorbed. Hereupon the catalyst is separated by filtration and the ethanol of the filtrate is distilled off in water jet vacuo. The residue is then distilled off in high vacuo and the obtained 3-amino-azacycloheptan-2-one has the boiling point 115°/0.02 torr.

(d) 3-benzylamino-azacycloheptan-2-one 10.6 g. of benzaldehyde and 2 g. of Raney-Nickel are poured into a solution of 12.8 g. of 3-amino-azacycloheptan-2-one in 250 ml. of ethanol. The mixture is shaken at 70° and at a hydrogen pressure of 10 atmospheres until the mixture does no longer absorb hydrogen. The Raney-Nickel is separated by filtration and the solvent is distilled off at water jet vacuum. The 3-benzylamino-azacycloheptan-2-one obtained is recrystallized from ethanol-water and has the melting point 76–77°.

We claim:

1. A compound of the formula:

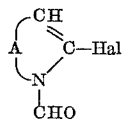

wherein:
A represents tetramethylene optionally substituted by alkyl having from 1 to 6 carbon atoms, and
Hal represents halogen.

2. 1-formyl-2-chloro-azacycloheptene-(2).
3. 5-tert-butyl-2-chloro-1-formyl-azacycloheptene-(2).
4. 1-formyl-2-bromo-azacycloheptene-(2).
5. A process for the production of a compound of the formula

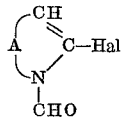

wherein:
A represents tetramethylene optionally substituted by alkyl having from 1 to 6 carbon atoms, and
Hal represents halogen which process comprises (a) reacting in the presence of an organic aprotic solvent and/or diluent a compound of the formula

wherein A has the meaning given above, with a formylating reactant which is the adduct of an N,N-disubstituted formamide of the formula

wherein:
$R_1$ represents an alkyl radical having 1 to 5 carbon atoms,
$R_2$ represents an alkyl radical having 1 to 5 carbon atoms, the phenyl radical, the benzyl radical or the cyclohexyl radical or
$R_1$ and $R_2$ together with the adjacent nitrogen atom represent a mononuclear heterocycle which may have other hetero atoms as ring members, and an acid halogenating agent and
(b) hydrolysing the resulting reaction product.

6. A process as described in claim 5, wherein said formylating reactant is the adduct of an N,N-disubstituted formamide and a halide of an inorganic oxyacid.

7. A process as described in claim 6, wherein said formylating reactant is an adduct of dimethyl formamide and a halide of an inorganic oxyacid.

8. A process as described in claim 7, wherein said formylating reactant is an adduct of dimethyl formamide and a phosphorus oxyhalide.

9. A process as described in claim 7, wherein said formylating reactant is an adduct of dimethyl formamide and a phosphorus trihalide or phosphorus pentahalide.

10. A process as described in claim 7, wherein said formylating reactant is an adduct of dimethyl formamide and phosgene.

11. A process as described in claim 7, wherein said formylating reactant is an adduct of dimethyl formamide and thionyl chloride.

12. A process as described in claim 6, wherein said azacycloalkanone is azacycloheptan-2-one.

13. A process as described in claim 6, wherein step (a) is carried out in the presence of an excess of N,N-disubstituted formamide as organic aprotic solvent and/or diluent.

References Cited

UNITED STATES PATENTS 3,152,175  10/1964  Ottenheym et al. _____ 260—239

FOREIGN PATENTS 1,058,521  2/1967  Great Britain _____ 260—239.3

ALTON D. ROLLINS, Primary Examiner

U.S. Cl. X.R.

260—239.3 R, 297 R, 326.5 E, 534 L